J. Zimmerman.
Culinary Boilers.
No 72354  Patented Dec. 17, 1867.

Sheet 2.
2 Sheets

Witnesses.
Chas. A. Pettit
Galen C. Kenou

Inventor.
John Zimmerman
By Munn & Co.
Attorneys

United States Patent Office.

JOHN ZIMMERMAN, OF ROYALTON CENTRE, NEW YORK.

Letters Patent No. 72,354, dated December 17, 1867.

IMPROVEMENT IN CULINARY BOILERS.

The Schedule referred to in these Letters Patent and making part of the same.

TO ALL WHOM IT MAY CONCERN:

Be it known that I, JOHN ZIMMERMAN, of Royalton Centre, in the county of Niagara, and State of New York, have invented a new and improved Steam-Cooking Apparatus; and I do hereby declare the following to be a full, clear, and exact description of the same, reference being had to the accompanying drawings, forming part of this specification, and in which—

Similar letters of reference indicate corresponding parts in the several figures.

Figure 1:
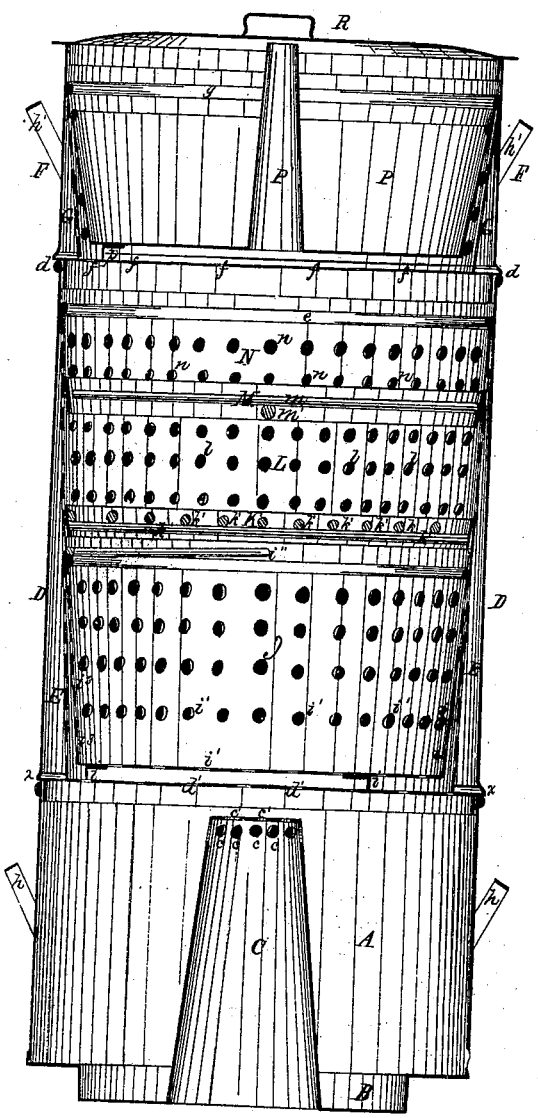
Figure 1 represents a vertical section of my improved steam-cooking apparatus.

In this invention a large number of cooking-vessels are so constructed that they can be arranged one above another in a vertical cylinder, and a variety of materials, vegetables, meats, pastry, cakes, &c., can be cooked at the same time in the cylinder, without interfering with each other, and with a single application of the steam.

In order that others skilled in the art to which my invention appertains may be enabled to make and use the same, I will proceed to describe it in detail.

In the drawings, A represents the boiler in which the steam is generated, having a rebated circular bottom, as shown at B, and a vertical central cone, or frustum of a cone, C, open at its bottom, and having series of apertures $c$ $c$ $c^1$ $c^1$ at and around its top. A cap may be provided for a cover to the top of the cone C, by which it may be closed to prevent the passage of the heat, heated air, &c., upwards through the apertures. This boiler generates the steam, which, either in connection with the heated air rising through the apertures $c$ $c^1$, or independently of it, according to the kind of cooking required, performs the operation of cooking the food in the vessels hereafter to be described.

The vessels in which the food is thus cooked are numerous, and designed for almost every kind of food, fish, fowl, flesh, or vegetable. They may be arranged in a multiplicity of ways, according to the service required of them. In cooking some meals, a great number of them may be in use at once, as shown in fig. 1. At other times, a less number may be required, and they may be arranged as in fig. 2. Again, it may be necessary to use but one at a time upon some occasions, and fig. 3 is designed to illustrate the simplest way of accomplishing this purpose. These three methods of arrangement do not, of course, constitute every possible arrangement that can be made; a great variety of others will suggest themselves to the mind at a glance. These are only intended as illustrations of the general method of working the apparatus. I will endeavor to give a particular description of these three arrangements.

In fig. 1, D represents a vertical cylinder, which is formed to fit tightly into the top of the cylinder A, its bottom having a flange or shoulder, $x$, which rests upon the upper edge of the boiler, and supports the cylinder in position. The bottom of the cylinder is perforated, as shown at $d^1$ $d^1$, to allow the steam from the boiler and heated air from the cone C to pass up. The top of the cylinder D is shown at $d\,d$. Inside of this is a foraminated bottomless vessel, E, the top of which is shown at $e$, its lower edges resting on the bottom of the cylinder D. The object of this vessel is not to hold food, but to provide a passage around next to the walls of the cylinder, from its top to its bottom, by which the steam can flow freely to every part of the apparatus, and to furnish inside of the cylinder an inclined wall, by means of which the various cooking-vessels may be supported at different heights.

The vessel E being thus placed in position, cooking-vessels I, L, and N, with gridirons K M, between them if desired, may be placed inside of it, the sizes of the vessels, &c., regularly increasing towards the top of the apparatus, so that each shall fit the vessel E at the point where it is to be fixed. The cooking-vessels are made in sizes adapted to this purpose.

These vessels, being thus arranged, if desired, another cylindrical vessel, F, may be placed above them, having a vessel, G, within it, corresponding to the vessel E in the cylinder D, above described. Inside of this any cooking-vessel may be placed. In the drawing, P represents a vessel for baking puddings, cakes, &c., having a central vertical cone, $P^1$, to conduct and distribute the heat more perfectly. R represents a cover which closes the whole apparatus in order to confine and utilize all the steam and heat. $m\,m^1$ are portions of one of the gridirons M, and K $K^1$ portions of another and larger one. $i''$ represents the bail or handle to the vessel I. $n\ n$, $l\ l$, and $i'\ i'$ represent apertures or perforations in the walls of the various cooking-vessels, for the admission of steam or heat to them. $p$ shows feet attached to the vessel P, and $i$ shows the same attached to the vessel I, for the purpose of leaving a space under these vessels for the free dissemination of the steam to every part of the apparatus. $h^1\ h^1$ are handles by which the apparatus, or any part of it, can be moved.

Figure 2:
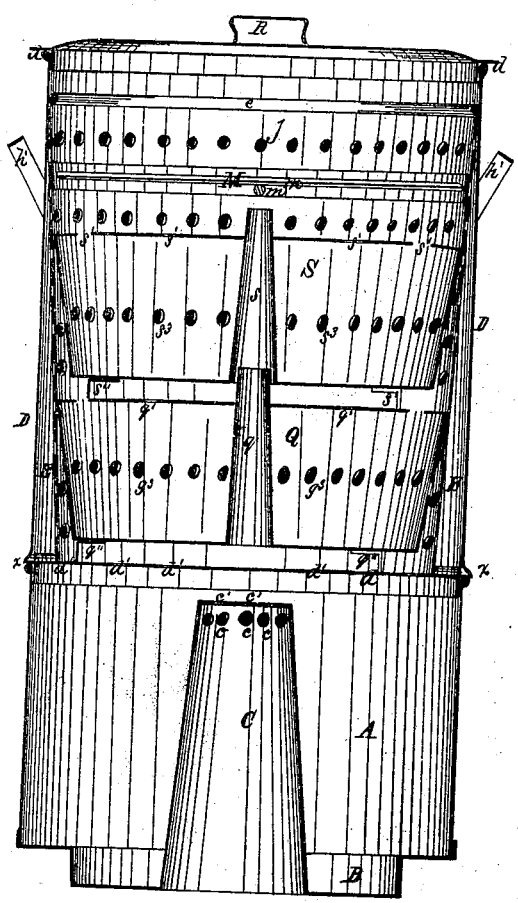
Figure 2 represents the same with a different arrangement of the vessels.
Figure 3:
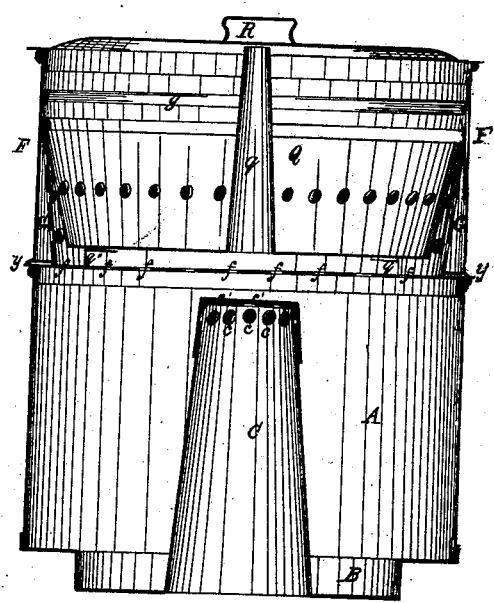
Figure 3 represents the same with a third arrangement of the vessels.

In fig. 2 the cylinder F and its enclosed vessels are omitted, together with some of the gridirons and cooking-vessels below. In place of them, vessels Q S are substituted, having central cones $q\ s$, feet $q''\ s''$, series of perforations $q^3\ s^3$, and perforations $q^1\ s^1$ through their tops.

In fig. 3 the cylinder D and its enclosed vessels are removed, and the cylinder F substituted. The vessel P is, however, removed, and in its place the vessel Q is used.

The vessel I, the body of which is shaped like a deep pan, and which has feet $i\ i$, the bail or handle $i''$, foraminated sides and bottom, and a foraminated and detachable cover, all provided to insure the free transmission of steam and heat, and for convenience and ease in handling and using is, I believe, novel in construction and use. So are, also, the two vessels Q and S. The latter have tight bottoms, provided with feet, as above described, and detachable foraminated covers, shown in the drawings in section, through which appear the perforations $q^1\ q^1\ s^1\ s^1$.

Each of these last two vessels has also one or more rows of perforations, $q^3\ s^3$, around its walls, the lowest row at half or two-thirds of the distance from the bottom to the top of the walls, and a central conductor, $q\ s$, through which the steam and heat are conducted freely upward, and distributed more perfectly to the contents of the vessels.

This apparatus is designed for the use generally of both the heat of the furnace and the steam of the boiler A upon the food at the same time, by which the operation of cooking will be greatly facilitated, large quantities of caloric being utilized that would otherwise be wasted. This double effect is secured by the use of the conical conductor C, which transmits the heated air, in conjunction with the boiler A, which generates the steam. When steam alone is desired for use, the conductor C may be closed by the cap alluded to above, and the supply of heated air thus cut off.

This apparatus has been thoroughly tested, and found to be the most convenient form and arrangement of steam-cooking apparatus yet devised, economizing heat to a greater degree and cooking more rapidly and perfectly than any other. All kinds of food may be cooked in it at the same time—vegetables, meats, and pastry—without being in the least degree injured by their proximity to each other. It costs but little, is compact, and easily cleaned. The foraminated bottomless vessels E and G are made loose and detachable for the special purpose of being easily removed and cleaned. In this respect the apparatus is far superior to one previously patented by me, in which similar vessels were employed, but were made firmly attached to the cylinders enclosing them, by which means dirt accumulating between the walls D and E could not easily be removed.

Having thus described my invention, what I claim as new, and desire to secure by Letters Patent, is—

1. The boiler A, having the central cone C with perforated top, substantially as and for the purpose described.

2. The detachable and foraminated bottomless vessels E G, substantially as and for the purpose described.

3. The vessels Q S, substantially as described.

4. The arrangement and combination of the boiler A, having the central cone C, with the cylinders D and F, or either of them, containing the bottomless vessels E G and the enclosed cooking-vessels, substantially as and for the purpose described.

To the above specification of my improvement, I have signed my hand, this twenty-seventh day of June, 1867.

JOHN ZIMMERMAN.

Witnesses:
    CHAS. A. PETTIT,
    L. HILL.